US009210659B2

(12) United States Patent
Kim

(10) Patent No.: US 9,210,659 B2
(45) Date of Patent: Dec. 8, 2015

(54) DORMANCY MODE CONTROL METHOD AND APPARATUS OF PORTABLE TERMINAL

(71) Applicant: Samsung Electronics Co. Ltd., Suwon-si, Gyeonggi-do (KR)

(72) Inventor: Taehwan Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 13/902,148

(22) Filed: May 24, 2013

(65) Prior Publication Data

US 2013/0316769 A1 Nov. 28, 2013

(30) Foreign Application Priority Data

May 25, 2012 (KR) .................. 10-2012-0055954

(51) Int. Cl.
*H04M 1/00* (2006.01)
*H04W 52/02* (2009.01)

(52) U.S. Cl.
CPC ................................. *H04W 52/0225* (2013.01)

(58) Field of Classification Search
CPC ........................... Y02B 60/50; H04W 52/0216
See application file for complete search history.

(56) References Cited

U.S. PATENT DOCUMENTS

| 6,516,421 | B1 * | 2/2003 | Peters ........................... 713/502 |
| 2007/0140199 | A1 * | 6/2007 | Zhao et al. .................... 370/338 |
| 2008/0090623 | A1 * | 4/2008 | Uh et al. ........................ 455/574 |
| 2010/0083026 | A1 * | 4/2010 | Millet et al. .................. 713/601 |
| 2011/0185202 | A1 * | 7/2011 | Black et al. ................... 713/320 |
| 2011/0292979 | A1 * | 12/2011 | Kim et al. ..................... 375/222 |

\* cited by examiner

*Primary Examiner* — Edward Urban
*Assistant Examiner* — Mohammed Rachedine
(74) *Attorney, Agent, or Firm* — Jefferson IP Law, LLP

(57) ABSTRACT

A method and an apparatus for controlling a dormancy mode of the portable terminal by minimizing the dormancy mode entry delay of the display in power-off state are provided. The method includes starting, when the application processor and the communication processor stop data communication in display power-off state, a dormancy mode timer, checking, when the dormancy mode timer expires, a dormancy mode flag indicating communication channel state, and entering, when the dormancy mode flag indicates a communication channel connection release state, the dormancy mode, wherein the dormancy mode timer counts a number of segments constituting a maximum standby time for entering the dormancy mode.

13 Claims, 5 Drawing Sheets

DORMANCY MODE CONTROL METHOD AND APPARATUS OF PORTABLE TERMINAL

PRIORITY

This application claims the benefit under 35 U.S.C. §119(a) of a Korean patent application filed on May 25, 2012 in the Korean Intellectual Property Office and assigned Serial No. 10-2012-0055954, the entire disclosure of which is hereby incorporated by reference.

BACKGROUND OF THE INVENTION

1. Field of the Invention

The present invention relates to a portable terminal. More particularly, the present invention relates to a dormancy mode control method and apparatus for reducing electric current consumption of the portable terminal by minimizing the dormancy mode entry delay of the display in a power-off state.

2. Description of the Related Art

With the advance of information processing and semiconductor technologies, portable terminals are becoming powerful devices and widespread in use. Recent portable terminals (e.g. mobile phones) include many functions such as a voice call function, a music player function, a text messaging function, a digital broadcast receiver function, a short range radio communication function, and an internet access function. Typically, the portable terminals are powered by battery. For the battery-powered portable terminals, power saving is one of the significant issues. Particularly, since the recent portable devices, such as a smartphone, that are equipped with multiple processors (e.g. a Communication Processor (CP) and an Application processor (AP)) tend to consume more electric current, the power-saving issue is becoming more and more important.

Typically, the portable terminal, such as a smartphone, equipped with multiple processors is configured such that the application processor does not receive unnecessary events from the communication processor in the display power-off state. Accordingly, in the conventional portable terminal, the application processor does not receive any communication channel connection release message from the communication processor or, if received, ignores the message without any action. In this case, the conventional portable terminal may fail immediate entry to the sleep mode after the connection release. In order to overcome this problem, the conventional portable terminal is configured to start a dormancy mode timer upon detection of the stop of data transmission of the communication processor in the display power-off state and, when the dormancy mode timer expires, the application processor enters the dormancy mode.

If the dormancy mode timer is initiated, the application processor calls a wake-lock function to prevent the application processor from entering the dormancy mode until the dormancy mode timer expires. Accordingly, the portable terminal may not enter the dormancy mode even in a state fulfilling the dormancy mode entry condition. Particularly, when the dormancy mode timer is set to a relatively large value, the dormancy mode entry is further delayed, resulting in an increase of electric current consumption. That is, the conventional portable terminal has a drawback in that the application processor stays in a wake-state unnecessarily in the display power-off, which wastes electric current.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of controlling a dormancy mode in a portable terminal.

In accordance with an aspect of the present invention, a method of controlling a dormancy mode in a portable terminal including an application processor and a communication processor is provided. The method includes starting, when the application processor and the communication processor stop data communication in display power-off state, a dormancy mode timer, checking, when the dormancy mode timer expires, a dormancy mode flag indicating communication channel state, and entering, when the dormancy mode flag indicates a communication channel connection release state, the dormancy mode, wherein the dormancy mode timer counts a number of segments constituting a maximum standby time for entering the dormancy mode.

In accordance with another aspect of the present invention, an apparatus for controlling a dormancy mode of a portable terminal is provided. The apparatus includes a communication processor which controls radio communication with a base station, and an application processor configured to communicate data with the communication processor and start, when the application processor and the communication processor stop data communication in display power-off state, a dormancy mode timer, check, when the dormancy mode timer expires, a dormancy mode flag indicating communication channel state, and enter, when the dormancy mode flag indicates a communication channel connection release state, the dormancy mode, wherein the dormancy mode timer counts a number of segments constituting a maximum standby time for entering the dormancy mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'dormancy mode' denotes the state in which the portable terminal is disconnected from the base station to be able to enter the sleep mode. That is, the dormancy mode is the state fulfilling a communication channel release among other factors that are preventing the terminal from entering the sleep mode, which occurs when all of the other factors are fulfilled.

In the following description, the portable terminal according to an embodiment of the present invention can be any type of terminal equipped with multiple processors and supporting the dormancy mode of the processors. For example, the terminals include a cellular communication terminal, a Personal Digital Assistant (PDA), a smartphone, a Tablet Personal Computer (PC), etc.

Figure 1:
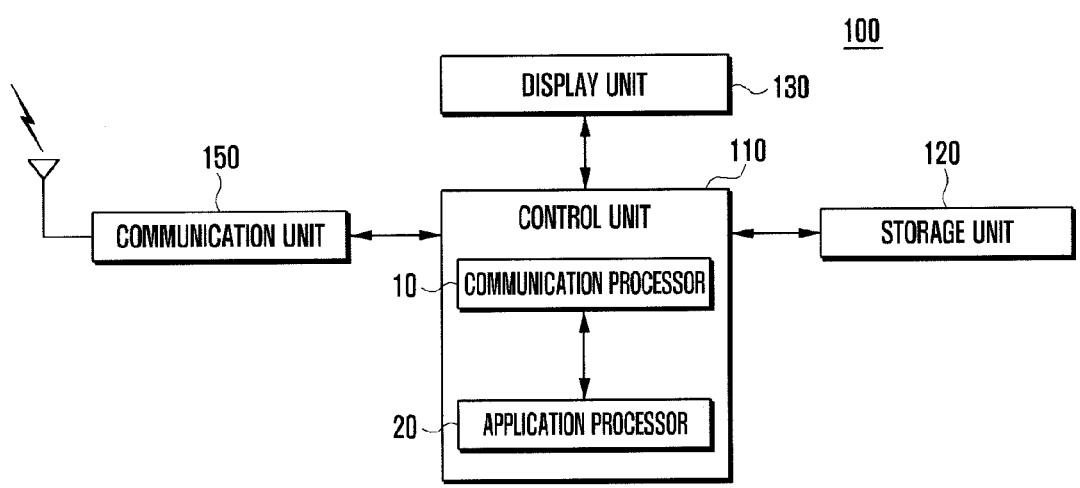
FIG. 1 is a block diagram of a portable terminal according to an exemplary embodiment of the present invention.
Figure 2:
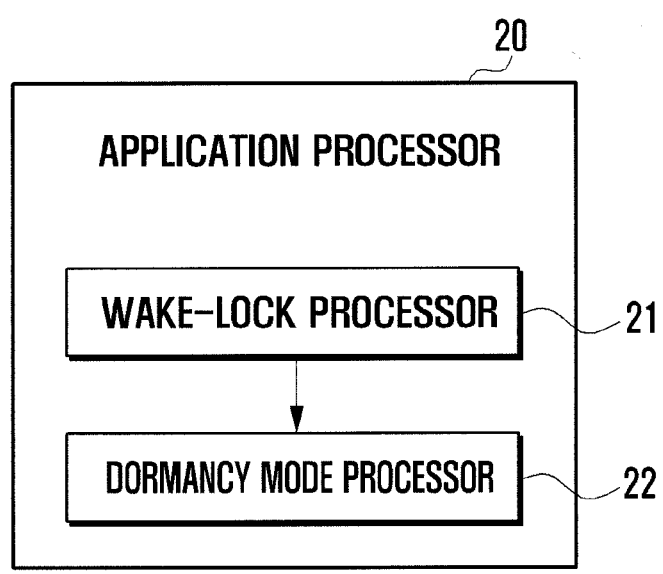
FIG. 2 is a block diagram of the application processor of the portable terminal of FIG. 1 according to an exemplary embodiment of the present invention.

FIG. 1 is a block diagram of a portable terminal according to an exemplary embodiment of the present invention, and FIG. 2 is a block diagram of the application processor of the portable terminal of FIG. 1 according to an exemplary embodiment of the present invention.

Referring to FIGS. 1 and 2, the portable terminal 100 according to an exemplary embodiment of the present invention includes a communication unit 150, a display unit 130, a storage unit 120, and a control unit 110. The control unit 110 includes a Communication Processor (CP) 10 and an Application Processor (AP) 20.

The communication unit 150 is capable of establishing a voice communication channel (for voice and video communication) and a data communication channel for data communication with a base station. For this purpose, the communication unit 150 includes a Radio Frequency (RF) transmitter (not shown) for up-converting and amplifying the transmission signal, a RF receiver (not shown) for low noise amplifying and down-converting the received signal, and a transmission/reception duplexer (not shown) for duplexing the transmission and reception signals. In an exemplary embodiment of the present invention, the communication unit 150 receives communication channel state information from the base station and transfers this information to the communication processor 10. For example, the communication unit 150 receives the message on the state of the Radio Resource Control (RRC) or traffic channel and transfers the message to the communication processor 10. The RRC is responsible for controlling the transport channels and physical channels related to the Radio Bearer (RB) configuration, reconfiguration, and release. The traffic channel denotes a radio frequency channel carrying voice and/or data and consists of downlink and uplink traffic channel information.

The display unit 130 displays various menus of the portable terminal 100 and the information input by and presented to the user. That is, the display unit 130 is capable of displaying various screens associated with the operations of the portable terminal 100, e.g., a home screen, a menu screen, a message composition screen, a call progressing screen, a schedule organization screen, a phonebook screen, a webpage screen, etc. Particularly, in an exemplary embodiment of the present invention, the display unit 130 powers off when there is no key input for a predetermined time or a display power-off key signal is input. The display unit 130 can be implemented with any suitable display such as, for example, a Liquid Crystal Display (LCD), an Organic Light Emitting Diode (OLED) display, and an Active Matrix OLED (AMOLED) display. In the event that the display 130 is implemented in the form of a touchscreen, the display unit 130 can work as an input device.

The storage unit 120 is capable of storing Operating System (OS) of the portable terminal 100, application programs associated with the optional functions such as audio, still and motion pictures, and broadcast playbacks, user data, and data transmitted/received in communication mode. For example, the storage unit 120 is capable of storing motion picture files, game files, audio files, video files, etc. Particularly, in an exemplary embodiment of the present invention, the storage unit 120 is capable of storing the programs controlling entering the application processor 20 to enter a dormancy mode. The dormancy mode control program includes routines for checking the end of data communication between communication processor 10 and application processor 20 in a display power-off state, dividing a predetermined maximum standby time into a predetermined number of segments for dormancy mode entry at the end of data transmission, initiating a dormancy mode timer for counting the divided standby time, toggling a dormancy mode flag when a communication channel connection release message is received from the communication processor 10, checking the dormancy mode flag upon expiration of the dormancy mode timer to enter if the flag is set to 1 and restart the dormancy mode timer if the flag is set to 0, and controlling the application processor 20 to enter the dormancy mode when the dormancy mode flag is set to 0 until the dormancy mode timer expires.

The storage unit 120 is also capable of storing the maximum standby time (T) and the number of segments (N) set for dormancy mode entry. The storage unit 120 also includes a dormancy mode flag value storage region and a region for storing a dormancy mode timer expiration count (n).

The control unit 110 controls overall operations of the portable terminal 100 and signal flows among the internal function blocks of the portable terminal and performs a data processing function. Particularly, in an exemplary embodiment of the present invention, the control unit 110 includes the communication processor 10 and the application processor 20.

The communication processor 10 is configured for controlling a radio communication function, a communication modem function, and a message processing function. The communication processor 10 is configured for receiving the communication channel (e.g. RRC or traffic channel) state message and transmitting the communication channel state message to the application processor 20 regardless of the power-on/off state of the display unit 130. That is, the communication processor 10, according to an exemplary embodiment of the present invention, is capable of synchronizing the communication channel state with the application processor 20 regardless of the power-on/off state of the display unit 130. In an exemplary embodiment of the present invention, the communication processor 10 is capable of receiving a communication channel connection release message from the base station and transferring the received communication channel connection release message to the application processor 20 in the display power-off state. If it is determined that the communication channel connection has been released, the communication processor 10 is capable of transmitting the communication channel connection release message to the application processor 20. For example, the communication channel connection release message can be transmitted from the base station to the portable terminal 100 when the communication has been completed therebetween or can be generated by the communication processor 10 when the portable terminal enters a low electric field area or non-service area.

The application processor 20 is the main processing device of the portable terminal 100 and responsible for the similar functions of the Central Processing Unit (CPU) of Personal Computer (PC). As shown in FIG. 2, the application processor 20 includes a wake lock processor 21 and a dormancy mode processor 22.

The wake-lock processor 21 prevents the portable terminal 100 from entering the sleep mode. That is, in an exemplary embodiment of the present invention, the wake-lock processor 21 is capable of interoperating with the dormancy mode processor 22. That is, if the dormancy mode processor 22 starts a dormancy mode timer, the wake-lock processor 21 is activated to prevent the portable terminal 100 from entering to the sleep mode until the dormancy mode timer expires.

The dormancy mode processor 22 is activated to start the dormancy mode timer when the data communication between the communication processor 10 and the application processor 20 is terminated in the display power-off state. The dormancy timer is capable of counting at each segment, the predetermined maximum standby time being divided into segments. For example, if the maximum standby time is set to 90 seconds and the number of segments is 9, the dormancy mode timer counts at every 10 second interval (=90 seconds/9). In this example, the dormancy mode timer is capable of counting in up to 9 segments.

If the segment period expires, the dormancy mode processor 22 checks whether a communication channel connection release message is received in the segment and determines whether to enter the dormancy mode depending on the check result. In more detail, if the dormancy mode timer starts, the application processor 20 checks whether the communication channel connection release message is received from the communication processor 10 and, if so, sets the dormancy mode flag to 1 to indicate entry into the dormancy mode. Here, the dormancy mode flag is set to 1 to indicate entry to the dormancy mode or is set to 0 to indicate non-entry to the dormancy mode.

If the dormancy mode timer expires, the dormancy mode processor 22 checks the dormancy mode flag and instructs, when the dormancy mode flag is set to 1, the application processor to enter the dormancy mode. At this time, the application processor 20 does not send any message to the communication processor 10. Otherwise, if no communication channel connection release message is received until the expiration of the dormancy mode timer and, thus, the dormancy mode flag set to 0 is not changed, the dormancy mode processor 22 sends a dormancy mode entry request message to the communication processor 10 and instructs the application processor 20 to enter the dormancy mode.

Although FIG. 1 illustrates that the communication processor 10 and the application processor 20 are integrated into a single device (e.g., a single integrated circuit), the communication processor 10 and the application processor 20 can be implemented on distinct devices.

The portable terminal 100 is capable of further including other devices (not shown) such as a Global Positioning System (GPS) module for receiving GPS signals, a broadcast reception module for receiving broadcast signals, a digital audio playback module such as an MP3 module, an Internet access module for an Internet connection, a motion sensor module for sensing motion of the portable terminal 100, etc. The portable terminal 100 can be implemented with or without at least one of aforementioned functional components and their equivalent devices.

Figure 3:
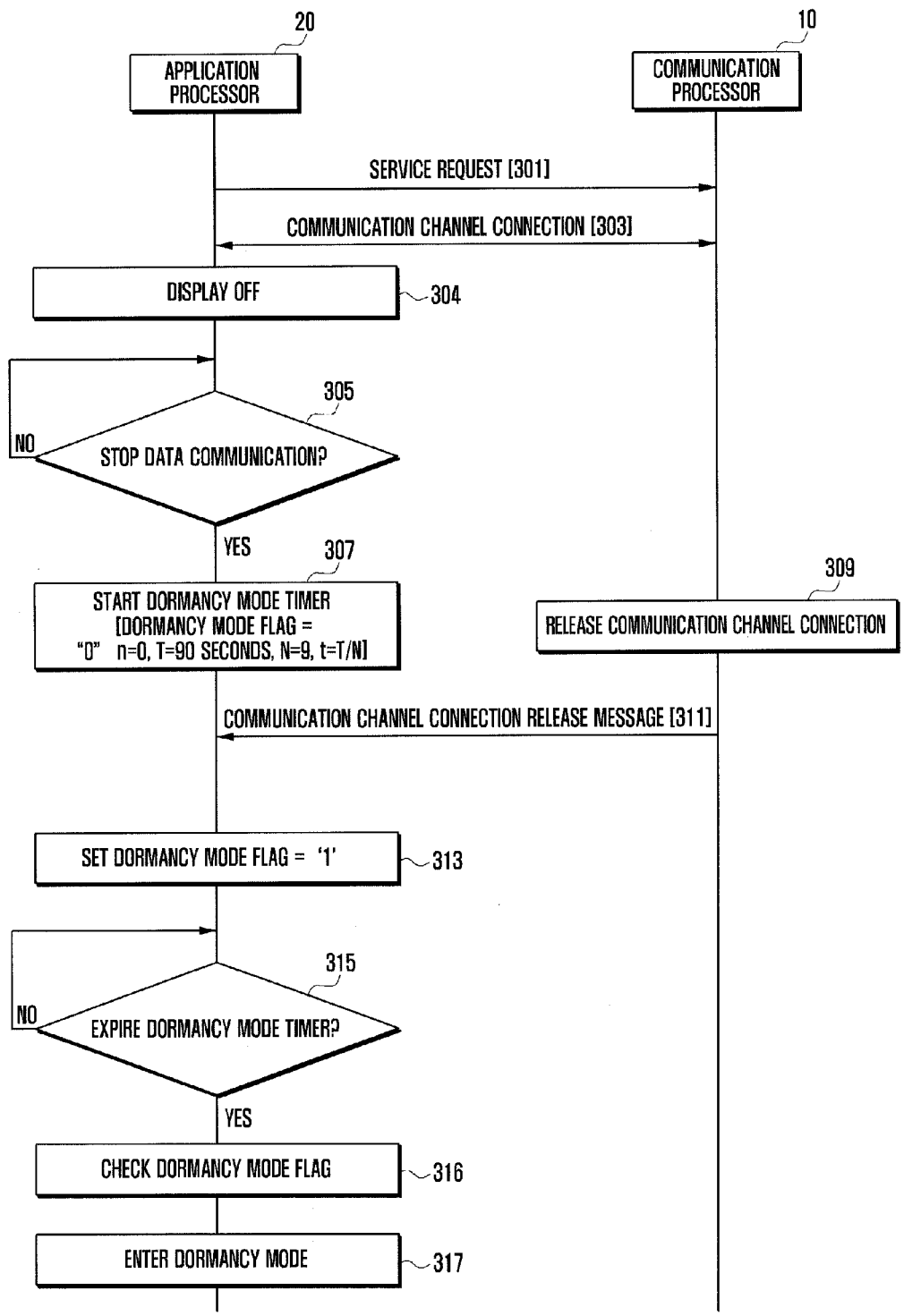
FIG. 3 is a flowchart illustrating a method of power saving with receipt of a communication channel connection release message in the dormancy mode according to an exemplary embodiment of the present invention.

FIG. 3 is a flowchart illustrating a method of power saving with receipt of a communication channel connection release message in the dormancy mode according to an exemplary embodiment of the present invention.

Referring to FIG. 3, the application processor 20 sends the communication processor 10 a service request at step 301 and establishes a communication channel with the communication processor 10 at step 303. At this time, the application processor 20 and the communication processor 10 can communicate data through Inter Process Communication (IPC) interface. The service request at step 301 is for requesting communication channel connection establishment.

The application processor 20 detects the power-off of the display unit 130 at step 304. When the power-off of the display unit 130 is detected, the application processor 20 determines whether the data communication with the communication processor 10 is terminated at step 305. The application processor 20 then monitors the communication channel until the data communication is terminated. If the data communication is terminated, the application processor 20 starts the dormancy mode timer at step 307. Here, a maximum standby time (T) for entering the dormancy mode is set to 90 seconds, and the number of segment periods (N) constituting the maximum standby time (T) is set to 9. At this time, each of the 9 segment periods (t) has the length of 10 seconds (T/N). The application processor 20 also sets the timer expiration counter (n) to 0 and the dormancy mode flag to 0. The maximum standby time (T) and the number of segments (N) can be values set by the communication carrier or terminal manufacturer.

If the dormancy mode timer starts, the application processor 20 is capable of configuring the wake-lock to prevent the portable terminal from entering the sleep mode for the corresponding segment period. That is, the application processor 20 is capable of setting the wake-lock timer to the same value as the segment period.

Meanwhile, the communication processor 10 releases the communication channel connection in response to the communication channel connection release message from the base station or according to self-determination at step 309 and sends the application processor 20 a communication channel connection release message at step 311.

Upon receipt of the communication channel connection release message, the application processor 20 sets the dormancy mode flag to 1 at step 313. Next, the application processor 20 determines whether the dormancy mode timer has expired at step 315. The application processor 20 monitors the dormancy mode timer until it expires. If the dormancy mode timer has expired, the application processor 20 checks the dormancy mode flag at step 316. Since the dormancy mode flag has been set to 1 at step 313, the application processor 20 enters the dormancy mode at step 317.

As described above, the power saving method according to an exemplary embodiment of the present invention is capable of receiving the communication channel state message (e.g. communication channel connection release message) even in the display power-off state and checking the channel state information at every segment period to determine whether to enter the dormancy mode. The power saving method according to an exemplary embodiment of the present invention is capable of detecting the communication channel connection release in the display power-off state to reduce the wake-lock time, resulting in reduction of electric current consumption.

Figure 4:
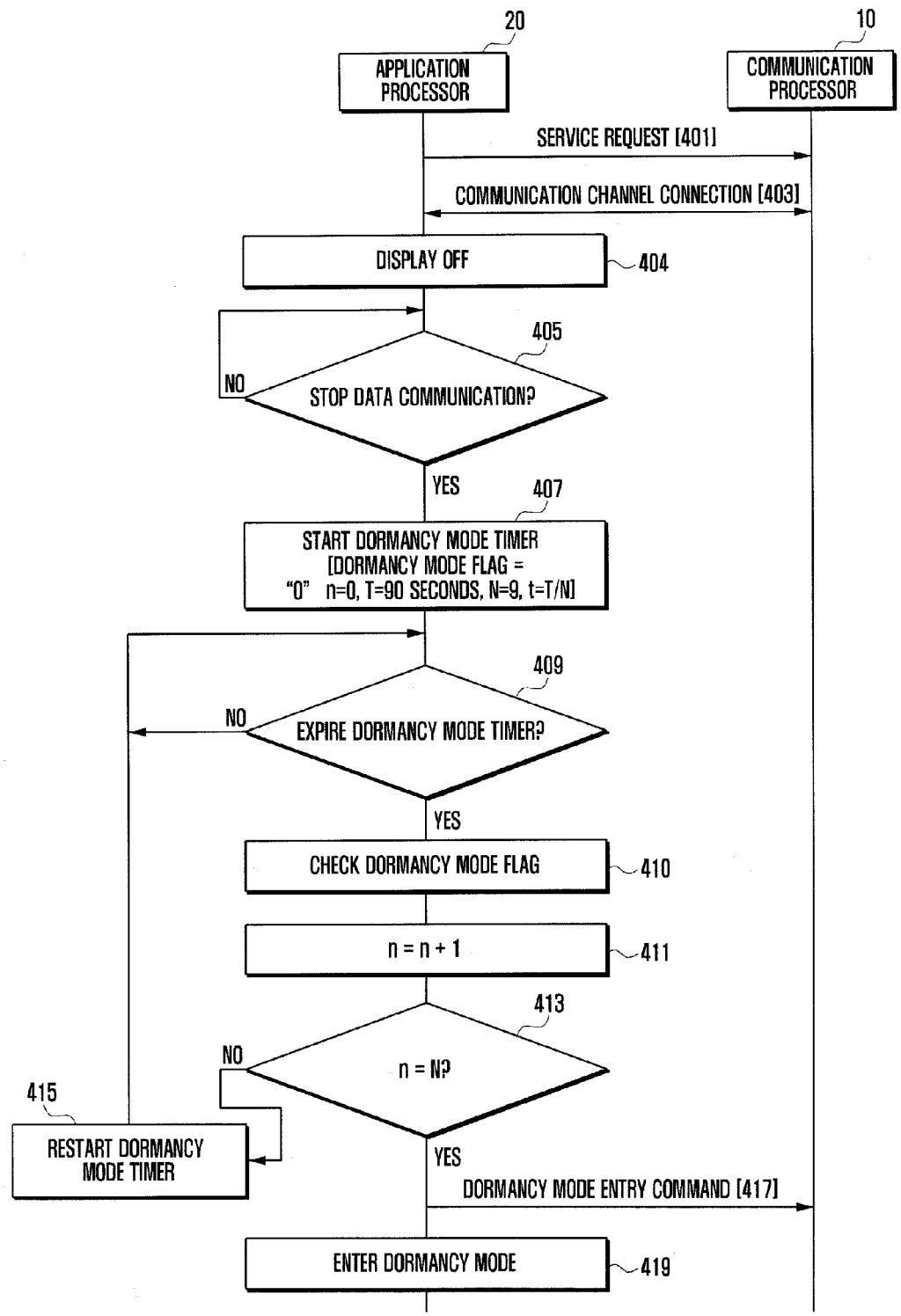
FIG. 4 is a flowchart illustrating a method of power saving without receipt of a communication channel connection release message in the dormancy mode according to an exemplary embodiment of the present invention.

FIG. 4 is a flowchart illustrating a method of power saving without receipt of a communication channel connection release message in the dormancy mode according to an exemplary embodiment of the present invention.

Referring to FIG. 4, the application processor 20 sends the communication processor 10 a service request at step 401 and establishes the communication channel with the communication processor 10 at step 403. At this time, the application processor 20 and the communication processor 10 are capable of communicating data through an IPC interface.

The application processor 20 detects the power-off of the display unit 130 at step 404. If the display power-off is detected, the application processor 20 determines whether the data communication with the communication is terminated at step 405. The application processor 20 monitors the communication channel until the data communication is terminated. If the data communication is terminated, the application processor 20 starts the dormancy mode timer at step 407. Here, maximum standby time (T) for entering the dormancy mode is set to 90 seconds, and the number of segments (N) constituting the maximum standby time (T) is set to 9. At this time, each of the 9 segment periods (t) has the length of 10 seconds (T/N). The application processor 20 also sets the timer expiration counter (n) to 0 and the dormancy mode flag to 0. The maximum standby time (T) and the number of segments (N) can be certain values set by the communication carrier or terminal manufacturer.

If the dormancy mode timer starts, the application processor 20 is capable of configuring the wake-lock to prevent the portable terminal 100 from entering the sleep mode for the corresponding segment period. That is, the application processor 20 is capable of setting the wake-lock timer period to the same value as the segment period.

The application processor 20 determines whether the dormancy mode timer has expired at step 409. The application processor 20 monitors the dormancy mode timer until it expires. If the dormancy mode timer has expired, the application processor 20 checks the dormancy mode flag at step 410. Since the communication channel connection message is not received, the dormancy mode flag remains set to 0.

If it is determined that the dormancy mode flag is set to 0, the application processor 20 increments the timer expiration counter (n) by 1 at step 411 and determines whether the timer expiration counter (n) is equal to the number of segments (N) at step 413. If the timer expiration counter (n) and the number of segments (N) mismatch, the application processor 20 restarts the dormancy mode timer at step 415 and returns to step 409 to continue determining whether the dormancy mode timer has expired at step 409. Otherwise if the timer expiration counter (n) and the number of segments (N) match, the application processor 20 sends the communication processor 10 a dormancy mode entry command at step 417 and enters the dormancy mode at step 419. The application processor 20 is also capable of sending the communication processor 10 the communication channel connection release request message and enters, when a response message is received form the communication processor 10, the dormancy mode. Here, the response message can be a communication channel connection release complete message or a message notifying of the communication channel release state.

Figure 5:
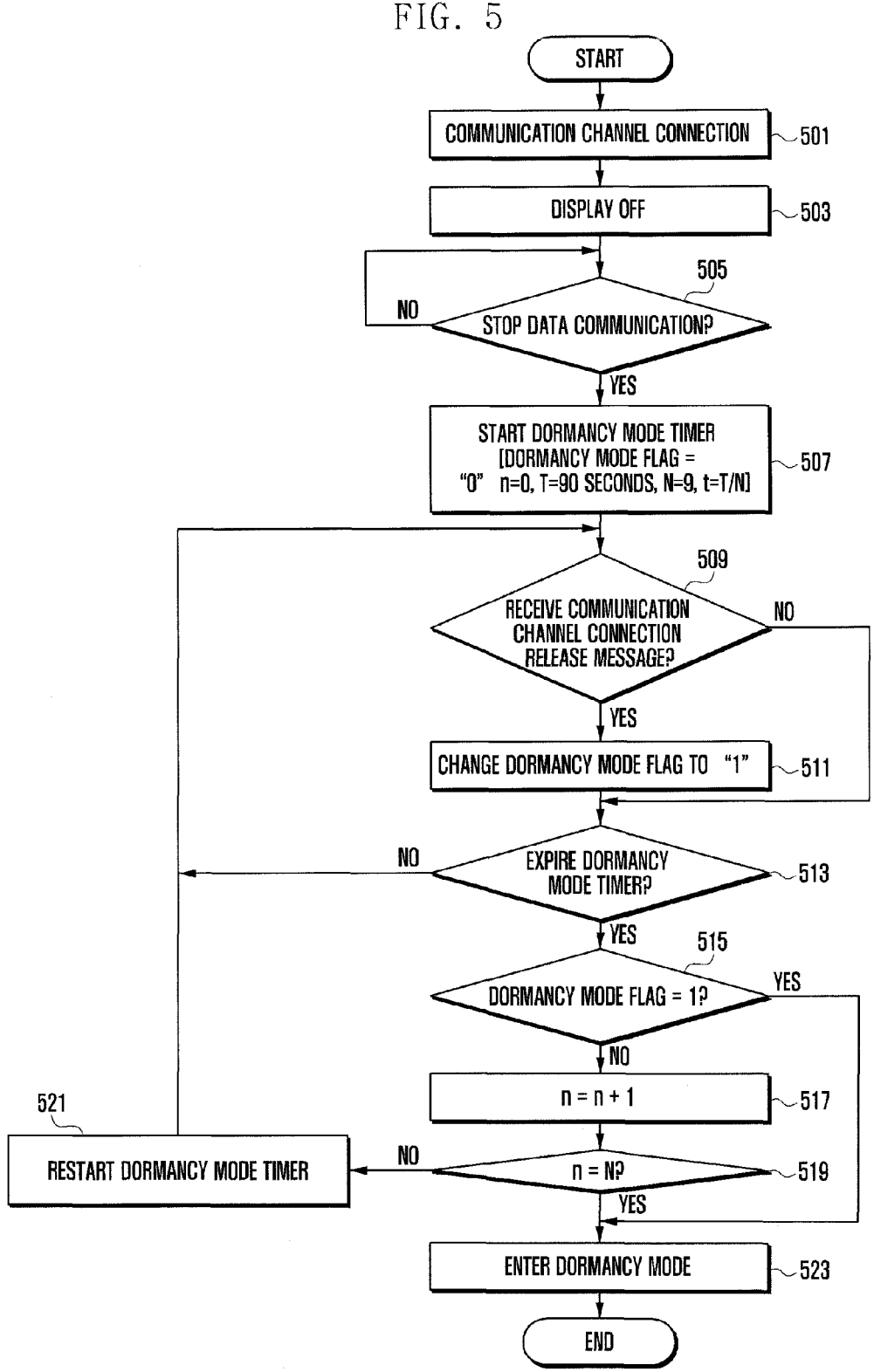
FIG. 5 is a flowchart illustrating a method of controlling the dormancy mode of the portable terminal according to an exemplary embodiment of the present invention.

FIG. 5 is a flowchart illustrating a method of controlling the dormancy mode of the portable terminal according to an exemplary embodiment of the present invention.

Referring to FIG. 5, the application processor 20 establishes a communication channel with the communication processor 10 and a base station at step 501. The application processor 20 detects power-off of the display unit 130 at step 503. If the display power-off is detected, the application processor 20 determines whether the data communication with the communication processor 10 is terminated at step 505. The application processor 20 monitors the communication channel until the data communication is terminated. If the data communication is terminated, the application processor 20 starts the dormancy mode timer at step 507. Here, maximum standby time (T) for entering the dormancy mode is set to 90 seconds, and the number of segments (N) constituting the maximum standby time (T) is set to 9. At this time, each of the 9 segment periods (t) has the length of 10 seconds (T/N). The application processor 20 also sets the timer expiration counter (n) to 0 and the dormancy mode flag to 0. The maximum standby time (T) and the number of segments (N) can be certain values set by the communication carrier or terminal manufacturer.

If the dormancy mode timer starts, the application processor 20 is capable of executing the wake-lock processor 21 to prevent the terminal from entering the sleep mode. That is, in the case that the wake-lock processor 21 has a timer, the application processor 20 is capable of setting the period of the timer of the wake-lock processor 21 to be equal to the segment period.

The application processor 20 determines whether a communication channel connection release message is received at step 509. If no communication channel connection release message is received, the procedure jumps to step 513. Otherwise, if the communication channel connection release message is received, the application processor 20 changes the dormancy mode flag to 1 at step 511.

Next, the application processor 20 determines whether the dormancy mode timer has expired at step 513. If the dormancy mode timer has not expired, the application processor 20 returns to step 509 to determine whether a communication channel connection release message is received. Otherwise, if the dormancy mode timer has expired, the application processor 20 determines whether the dormancy mode flag is set to 1 at step 515. If the dormancy mod flag is set to 1, the application processor 20 enters the dormancy mode at step 523. Otherwise, if the dormancy mode flag is not set to 1, the application processor 20 increments the timer expiration counter (n) by 1 at step 517 and determines whether the timer expiration counter (n) is equal to the number of segments (N) at step 519. If the timer expiration counter (n) is not equal to the number of segments (N), the application processor 20 restarts the dormancy mode timer at step 521 and returns to step 509 to determine whether a communication channel connection release message is received. Otherwise, if the timer expiration counter (n) is equal to the number of segments (N), the application processor 20 enters the dormancy mode at step 523.

As described above, the method and apparatus for controlling a dormancy mode of the portable terminal according to exemplary embodiments of the present invention is capable of allowing the application processor to receive and process the communication channel state message regardless of the display power-on/off state and determining whether the portable terminal has entered the dormancy mode at each segment constituting the period of the dormancy mode timer (maximum standby time), thereby entering the sleep mode quickly as possible and, as a consequence, reducing consumption of electric current.

It will be appreciated that exemplary embodiments of the present invention according to the claims and description in the specification can be realized in the form of hardware, software or a combination of hardware and software.

Any such software may be stored in a non-transitory computer readable storage medium. The computer readable storage medium stores one or more programs (software modules), the one or more programs comprising instructions, which when executed by one or more processors in an electronic device, cause the electronic device to perform a method of the present invention.

The above-described dormancy mode control method of a portable terminal according to the present invention can be recorded in a computer-readable storage media in the form of program commands executable by means of various types of computing means. Here, the computer-readable storage media can store the program commands, data files, and data structures independently or in the form of a combination. The program commands recorded in the storage media can be designed and configured for dedicated use in the present invention or the ones well-known to those in the field. The computer-readable media may be magnetic media such as a hard disk, a floppy disk and magnetic tape, optical media such as a Compact Disk Read-Only Memory (CD-ROM) and a Digital Versatile Disk (DVD), magneto-optical media such as floptical disk, and hardware devices such as a ROM, a Random-Access Memory (RAM), a flash memory, etc., particularly implemented to store and execute program commands. The program commands may be machine language codes produced by a compiler and high-level language codes that can be executed by computers using an interpreter, etc. In order to perform the operations of the present invention, the hardware devices may be implemented to operate as at least one software module, and vice versa.

While the invention has been shown and described with reference to certain exemplary embodiments thereof, it will be understood by those skilled in the art that various changes in form and details may be made therein without departing from the spirit and the scope of the invention the appended claims and their equivalents.

What is claimed is:

1. A method of controlling a dormancy mode in a portable terminal including an application processor and a communication processor, the method comprising:
starting, by the application processor, a dormancy mode timer when the application processor and the communication processor stop data communication;
changing, by the application processor, a dormancy mode flag indicating a communication channel state to indicate a communication channel connection release state when a communication channel connection release message is received from the communication processor;
checking, by the application processor, the dormancy mode flag when the dormancy mode timer is expired; and
entering, by the application processor, the dormancy mode when the dormancy mode flag indicates the communication channel connection release state,
wherein the dormancy mode timer expires at every segment period, which is set by dividing a maximum standby time for entering the dormancy mode into a number of segments.

2. The method of claim 1, further comprising:
determining, by the application processor, whether a dormancy mode timer expiration counter is equal to the number of segments when the dormancy mode flag indicates a communication channel connection maintenance state, and
restarting, when the dormancy mode timer expiration counter is not equal to the number of segments, the dormancy mode timer and increasing the dormancy mode timer expiration counter by 1.

3. The method of claim 2, further comprising entering, when the dormancy mode timer expiration counter is equal to the number of segments, the dormancy mode.

4. The method of claim 1, further comprising:
maintaining, when no communication channel connection release message is received, the dormancy mode flag indicating a communication channel connection maintenance state.

5. The method of claim 1, further comprising configuring, when the dormancy mode timer starts, a wake-lock for preventing the application processor from entering the dormancy mode until the dormancy mode timer expires.

6. An apparatus for controlling a dormancy mode of a portable terminal, the apparatus comprising:
a communication processor configured to control a radio communication with a base station; and
an application processor configured to:
communicate data with the communication processor,
start, when the application processor and the communication processor stop data communication, a dormancy mode timer,
change a dormancy mode flag indicating a communication channel state to indicate a communication channel connection release state when a communication channel connection release message is received from the communication processor,
check, when the dormancy mode timer expires, the dormancy mode flag, and
enter, when the dormancy mode flag indicates the communication channel connection release state, the dormancy mode,
wherein the dormancy mode timer expires at every segment period, which is set by dividing a maximum standby time for entering the dormancy mode into a number of segments.

7. The apparatus of claim 6, wherein the application processor is further configured to:
determine, when the dormancy mode flag indicates a communication channel connection maintenance state, whether a dormancy mode timer expiration counter is equal to the number of segments,
restart, when the dormancy mode timer expiration counter is not equal to the number of segments, the dormancy mode timer, and
enter, when the dormancy mode timer expiration counter is equal to the number of segments, the dormancy mode.

8. The apparatus of claim 7, wherein the application processor is further configured to increment, when the dormancy mode timer expiration counter is not equal to the number of segments, the dormancy mode timer expiration counter by 1.

9. The apparatus of claim 6, wherein the application processor is further configured to:
 determine whether a communication channel connection release message is received to maintain, when no communication channel connection release message is received, the dormancy mode flag indicating a communication channel connection maintenance state.

10. The apparatus of claim 6, wherein the application processor is further configured to enable, when the dormancy mode timer starts, a wake-lock for preventing the application processor from entering the dormancy mode until the dormancy mode timer expires.

11. The apparatus of claim 6, wherein the application processor comprises:
 a wake-lock processor configured to configure a wake-lock for preventing the portable terminal from entering a sleep mode before an expiration of the dormancy mode timer, and
 a dormancy mode processor configured to:
  start the dormancy mode timer, and
  enter the dormancy mode.

12. The apparatus of claim 6, wherein the communication channel connection release message is one of received from the base station and generated by the application processor when the communication channel connection with the base station is released.

13. A non-transitory computer-readable storage medium storing instructions that, when executed, cause at least one processor to perform the method of claim 1.

* * * * *